(12) United States Patent
Laber et al.

(10) Patent No.: US 10,755,208 B2
(45) Date of Patent: Aug. 25, 2020

(54) METHODS, APPARATUS AND SYSTEM FOR MEDIATING SERVICES

(75) Inventors: Werner Laber, Ubstadt-Weiher (DE);
Ralf Besinger, Mannheim (DE);
Andreas Heinzmann, Weinheim (DE);
Christian Hoffmann, Mannheim (DE);
Jens-Peter Jensen, Ludwigshafen (DE)

(73) Assignee: SAP SE, Walldorf (DE)

( * ) Notice: Subject to any disclaimer, the term of this patent is extended or adjusted under 35 U.S.C. 154(b) by 757 days.

(21) Appl. No.: 13/586,774

(22) Filed: Aug. 15, 2012

(65) Prior Publication Data

US 2014/0052483 A1 Feb. 20, 2014

(51) Int. Cl.
*G06Q 10/06* (2012.01)

(52) U.S. Cl.
CPC .................................. *G06Q 10/06* (2013.01)

(58) Field of Classification Search
CPC ..................................................... G06Q 10/06
USPC ........................................................ 705/7.12
See application file for complete search history.

(56) References Cited

U.S. PATENT DOCUMENTS

| | | | | |
|---|---|---|---|---|
| 7,162,509 B2 * | 1/2007 | Brown et al. | ................. | 709/201 |
| 7,698,398 B1 * | 4/2010 | Lai | ............................ | G06F 8/10 |
| | | | | 709/223 |
| 7,739,695 B2 * | 6/2010 | Wood et al. | ................. | 719/328 |
| 7,774,485 B2 * | 8/2010 | Patrick et al. | ................. | 709/229 |
| 7,912,810 B2 * | 3/2011 | Wittmann et al. | ............ | 707/607 |
| 8,069,435 B1 * | 11/2011 | Lai | ............................... | 717/106 |
| 8,261,295 B1 * | 9/2012 | Risbood | .................... | G06F 8/61 |
| | | | | 717/177 |
| 2003/0023472 A1 * | 1/2003 | Lee | ........................ | G06F 9/5038 |
| | | | | 709/226 |
| 2003/0191679 A1 * | 10/2003 | Casati | .................. | G06Q 10/109 |
| | | | | 705/7.12 |
| 2004/0024627 A1 * | 2/2004 | Keener | .................. | G06Q 10/06 |
| | | | | 705/7.36 |
| 2005/0223109 A1 * | 10/2005 | Mamou et al. | ................ | 709/232 |
| 2006/0005063 A1 * | 1/2006 | Patrick et al. | .................... | 714/1 |
| 2006/0259605 A1 * | 11/2006 | Altenhofen et al. | .......... | 709/223 |
| 2006/0277079 A1 * | 12/2006 | Gilligan | ................. | G06Q 10/10 |
| | | | | 705/6 |
| 2007/0011126 A1 * | 1/2007 | Conner et al. | ................... | 706/47 |
| 2007/0214173 A1 * | 9/2007 | Ohashi | .................... | G06Q 10/06 |
| 2007/0266051 A1 * | 11/2007 | Moore | .................... | G06Q 10/10 |
| 2007/0294364 A1 * | 12/2007 | Mohindra et al. | ............ | 709/217 |

(Continued)

OTHER PUBLICATIONS

Dinesh Ganesarajah and Emil Lupu. "Workflow-based composition of web-services: a business model or a programming paradigm?", In Proceedings of the 6th International Enterprise Distributed Object Computing Conference (EDOC 2002), Sep. 17-20, 2002, Lausanne, Switzerland, Proceedings. IEEE Computer Society 2002, ISBN 0-7695-1742-0.*

(Continued)

*Primary Examiner* — Eric W Stamber
*Assistant Examiner* — George H Walker, III
(74) *Attorney, Agent, or Firm* — Schwegman Lundberg & Woessner, P.A.

(57) ABSTRACT

A computerized method for providing a service is described. The method may instantiate an instance of a process object. The process object may be configured to manage two or more business process objects of one or more backend systems to provide the service. The service may be performed utilizing the process object.

20 Claims, 11 Drawing Sheets

(56) References Cited

U.S. PATENT DOCUMENTS

| | | | |
|---|---|---|---|
| 2008/0140760 A1* | 6/2008 | Conner et al. | 709/201 |
| 2008/0140857 A1* | 6/2008 | Conner | G06Q 10/00 709/236 |
| 2009/0083058 A1* | 3/2009 | Beringer et al. | 705/1 |
| 2009/0089741 A1* | 4/2009 | Bornhoevd et al. | 717/106 |
| 2009/0193433 A1* | 7/2009 | Maes | 719/315 |
| 2009/0235167 A1* | 9/2009 | Boyer et al. | 715/708 |
| 2010/0031090 A1* | 2/2010 | Bernardini et al. | 714/38 |
| 2010/0107136 A1* | 4/2010 | Fildebrandt | G06Q 10/10 717/105 |
| 2010/0131649 A1* | 5/2010 | Ferris | G06F 9/5072 709/226 |
| 2010/0169888 A1* | 7/2010 | Hare et al. | 718/102 |
| 2011/0035757 A1* | 2/2011 | Comer | G06F 9/485 719/314 |
| 2011/0145278 A1* | 6/2011 | Maes | 707/769 |
| 2011/0218924 A1* | 9/2011 | Addala et al. | 705/301 |
| 2012/0317033 A1* | 12/2012 | Heidasch | G06Q 10/06 705/51 |
| 2013/0031014 A1* | 1/2013 | Richter | G06Q 30/06 705/320 |

OTHER PUBLICATIONS

Zhongxian Bao, Pengshou Xie, Aihong Zhu, and Hong Zhang. "An EAI Integration Framework Based on J2EE," In Proceedings of the 2009 International Workshop on Information Security and Application (IWISA 2009), ISBN 978-952-5726-06-0.*

Dave Shaffer and Brian Dayton. "Orchestrating Web Services: The Case for a BPEL Server." An Oracle White Paper, Jun. 2004.*

Joan Lawson and Dave Shaffer. "Mastering SOA; Part 3: Orchestrating into End-to-End Processes." Feb. 2007, downloaded from http://www.oracle.com/technetwork/topics/soa/part3-092188. html[Nov. 10, 2014 12:57:18 PM].*

Olaf Zimmermann, Vadim Doubrovski, Jonas Grundler, and Kerard Hogg. 2005. Service-oriented architecture and business process choreography in an order management scenario: rationale, concepts, lessons learned. In Companion to the 20th annual ACM SIGPLAN conference on Object-oriented programming, systems, languages, and applications (OOPSLA '05). ACM.*

* cited by examiner

METHODS, APPARATUS AND SYSTEM FOR MEDIATING SERVICES

FIELD

The present disclosure relates generally to providing services. In an example embodiment, the disclosure relates to utilizing a Process Object Layer to mediate business services with backend systems.

BACKGROUND

Business services and processes conventionally have multiple front-end or channel, applications and multiple backend applications, and include process steps that call enterprise services provided by a plurality of process components in a backend platform. It is advantageous to be able to orchestrate services utilizing multiple backend system instances since a plurality of process components are required for executing many services. Thus, it is may be advantageous to integrate multiple front-end, or channel, applications and multiple backend systems into an integrated environment. In some instances, it is advantageous to integrate heterogenous backend systems into the integrated environment.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and competing program products that embody example embodiments of the present invention. In the following description, for purposes of explanation, numerous specific details are set forth in order to provide an understanding of various embodiments of the inventive subject matter. It will be evident however to those skilled in the art that embodiments of the inventive subject matter may be practiced without these specific details. In general, well-known instruction instances, protocols, structures and techniques have not been shown in detail.

Process Object Layer Framework

Generally, example embodiments of a "Process Object Layer (POL)" framework are disclosed that may provide a comprehensive solution for managing process steps across a services platform comprising process components. In one example embodiment, the process components are backend systems. In one example embodiment, the process components are heterogeneous backend systems.

The POL framework provides a model-driven software development infrastructure that enables the building of process objects according to a standard architecture and programming model. Each process object may manage processes across a plurality of business objects residing, for example, on backend systems in a services platform. The POL framework may, for example, provide a meta-model, process model, run-time environment, and design time environment. The POL framework optionally includes the ability to model implement, execute, and extend the underlying service processes.

In an example embodiment, the design time environment within the POL framework may enable the definition and generation of process objects for a process object layer. A run-time environment within the POL framework may provide for the usage of the process object to perform a service and for the integration and orchestration of processes executing on backend systems.

Run Time Environment

Figure 1:
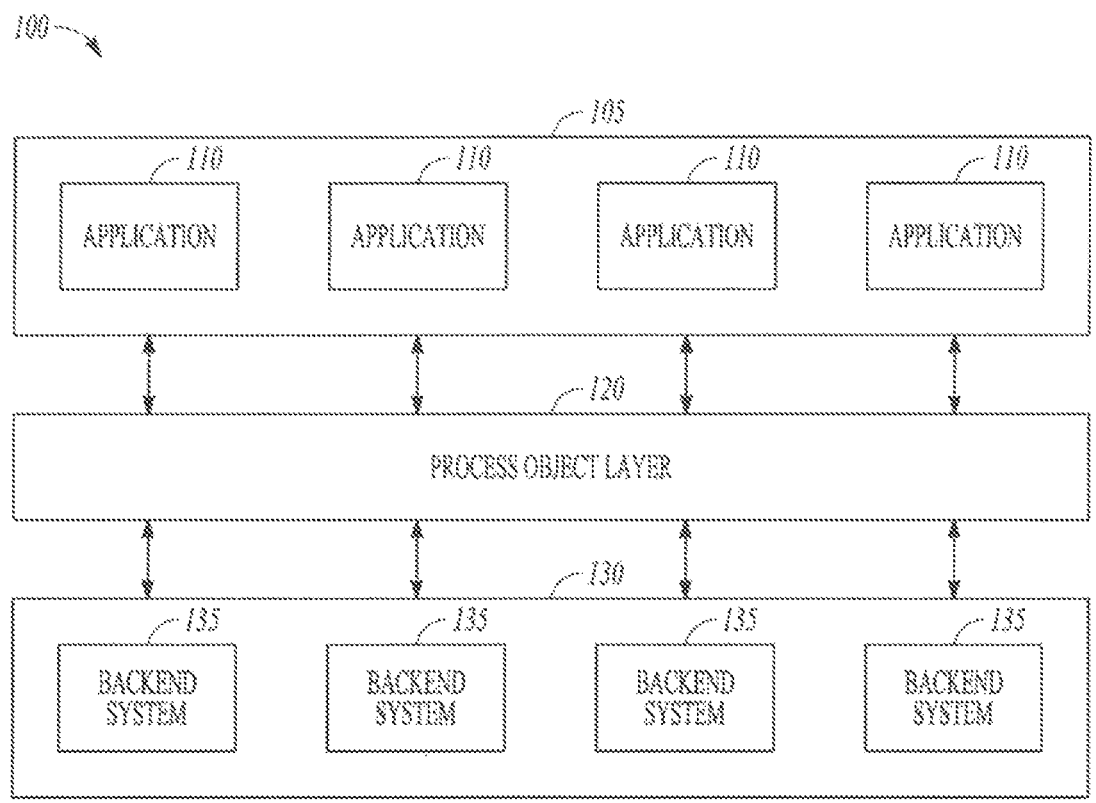
FIG. 1 is a block diagram of a run-time environment for performing services in accordance with an example embodiment.

FIG. 1 is a block diagram of a run-time environment 100 according to an example embodiment. The run-time environment 100 comprises one or more applications 110 such as front-end or channel applications; a process object layer 120; and a services platform 130.

The applications 110 include, but are not limited to, on-line banking applications, mobile banking applications, call center applications, reseller applications and the like. For example, an on line banking application may enable a bank client to perform banking activities, such as opening a checking account, applying for a loan or transferring funds between accounts, via the Internet. In one example embodiment, one or more of the applications 110 may create a presentation layer comprising specific user interfaces for human-to-machine interaction (also known in the art as the UI-Layer). In one example embodiment, the applications may be channels for machine-to-machine interaction.

The services platform 130 is shown by way of example to comprise one or more backend systems 135 for performing one or more services. Examples of the backend systems 135 include backend systems provided by third-party business partners, backend systems for performing banking services, backend systems for providing sales services and the like. In one example embodiment, one or more business process objects residing on the backend systems 135 may include, for example, business logic. The services or operations provided by the backend systems 135 may be consumed by the process object layer 120. In an example embodiment, the backend systems 135 provide low level business logic in fine granular business process objects resulting in "atomic"

services. The "atomic" services may be responsible for performing consistent business transactions on individual business process objects.

Figure 2:
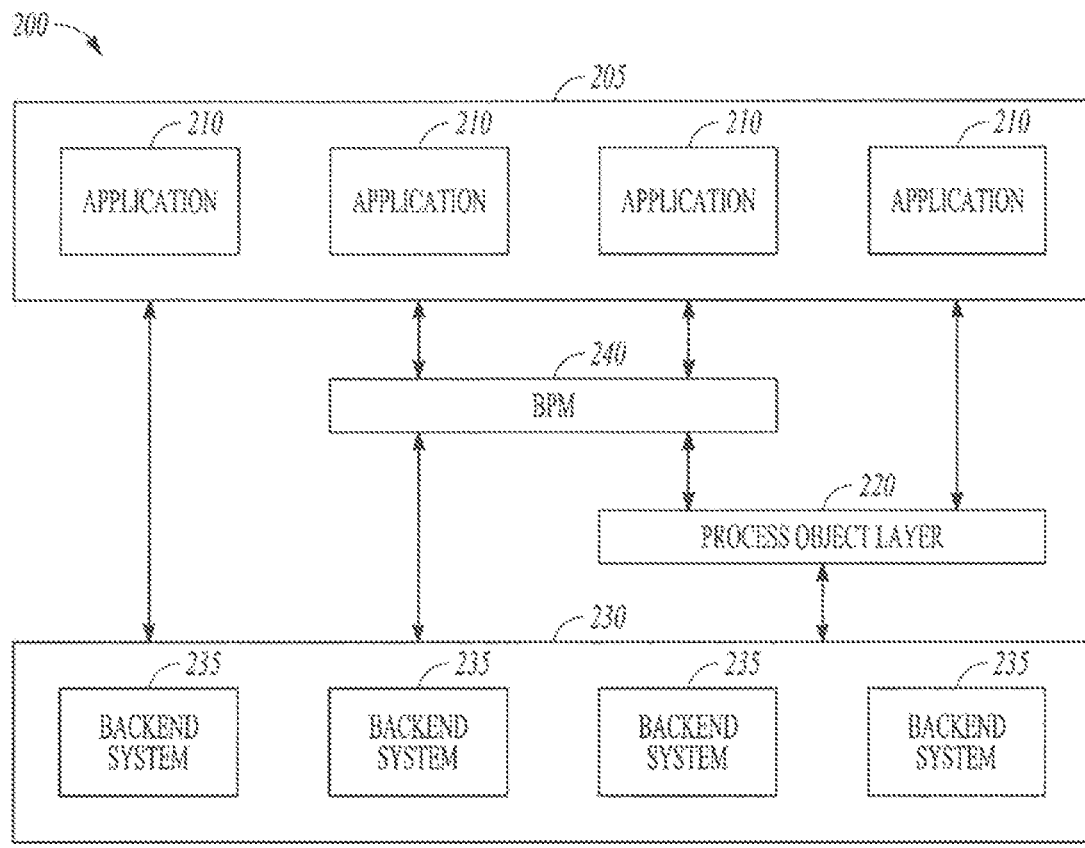
FIG. 2 is a block diagram of a run-time environment for performing services in accordance with an example embodiment.

FIG. 2 is a block diagram of a run-time environment 200 according to an example embodiment. The run-time environment 200 comprises one or more applications 210, such as front-end or channel applications; a process object layer 220; a services platform 230; and a Business Process Management (BPM) system 240. Applications 210, process object layer 220, and backend systems 235 are similar to applications 110, process object layer 120, and backend systems 135 described by way of example above with reference to FIG. 1. The BPM system 240 may provide for the automated execution of services as background processes.

In an example embodiment, the process object layer 220 may act as a mediator between the applications 210 and the backend systems 235. In an example embodiment, the process object layer 220 may provide a single aggregated service which consumes multiple backend services. For example, in order to perform certain business processes where multiple single atomic services are needed, the process object layer 220 may include the process knowledge and orchestration necessary to aggregate multiple single atomic services into a compound service that can be offered, for example, to the application layer 205.

In one example embodiment the process object layer 220 performs one or more of the following example functions:

providing and maintaining information about the business process context and state:

recording monitoring information (such as status information for one or more backend systems 235);

performing error and exception handling;

buffering data that may be required by business processes;

performing process related checks; and/or providing encapsulation of process knowledge to facilitate interfacing with one or more backend systems 235.

The process object layer 220 may therefore be capable of managing processes involving a plurality of business process objects residing on the services platform 230. The process object layer 220 is described, by way of example, more fully below.

In one example embodiment, the applications layer 205 and the process object layer 220 may have knowledge of their supporting lower layers, but have limited knowledge of their upper layers. For example, the process object layer 220 may have extensive knowledge of the services platform 230, and limited knowledge of the application layer 205. In one example embodiment, the notification of an upper layer from a lower layer may be implemented via a message, or event, captured by an upper layer. For example, the services platform 230 can notify the process object layer 220 via a message. In one example embodiment, a process in an upper layer may perform polling to obtain the status of a process in a lower layer.

In an example embodiment, a separation of channel (application) data and process data may enable a service to initiate processing on one channel (e.g., application 210) and continue processing via a different channel (e.g., a different application 210). For example, a process in the process object layer 220 may transfer from interfacing with a self-service application to interfacing to a call center application and subsequently transfer from interfacing with the cab center application to interfacing with a bank branch application.

Process Object Layer

Figure 3:
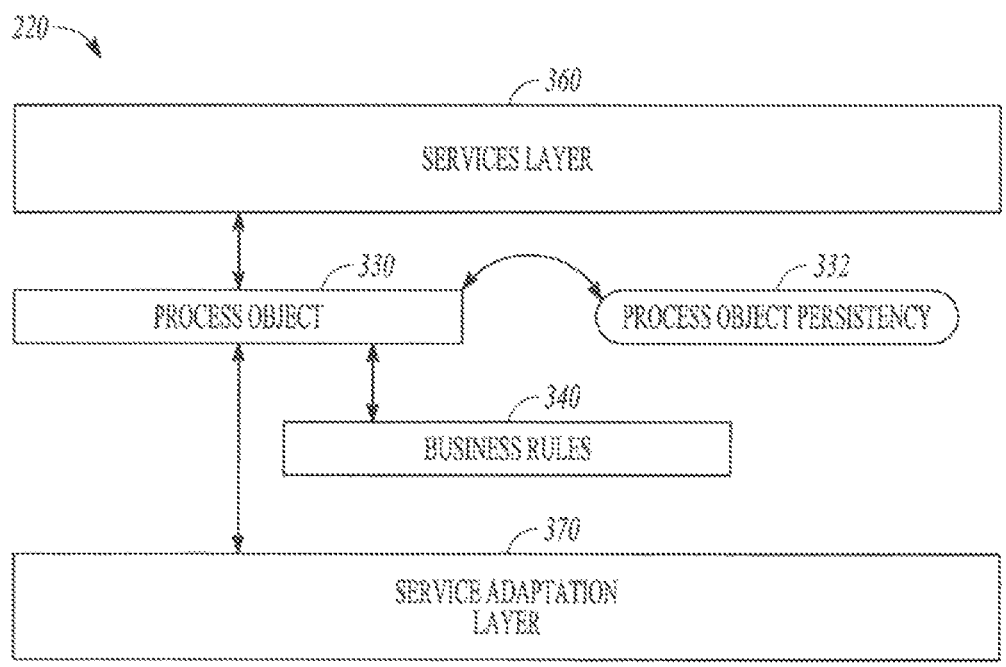
FIG. 3 is a block diagram of a run-time environment of the process object layer of FIG. 2 in accordance with an example embodiment.

FIG. 3 is a block diagram of a run-time environment of the process object layer 220 of FIG. 2 in accordance with an example embodiment. The process object layer 220 may comprise one or more process objects 330 and corresponding process object persistency 332, one or more sets of business rules 340, a services layer 360, and a service adaptation layer 370.

The process object layer 220 may provide for the composition and orchestration (e.g., business process management) of business services by consuming and orchestrating processes that may be provided by enterprise services. Examples of enterprise services include, but are not limited to, services offered by one or more backend systems 235. In one example embodiment, the process object layer 220 may be responsible for technological heterogeneity, such as the integration of the one or more backend systems 235 that are heterogenous.

In one example embodiment, the services layer 360 may comprise a set of standardized services for accessing and manipulating the process object 330, or accessing and manipulating a portion of the process object 330. For example, the process object node, described by way of example more fully below, within the process object 330 may be manipulated or updated. In one example embodiment, the services layer 360 may maintain information about status change events. The services layer 360 may facilitate the offering of services provided by the process object layer 220 for consumption from the application layer 205.

Each set of the business rules 340 may comprise one or more business rules. In one example embodiment, a business rule, by way of example, for a banking service may indicate that a client is entitled to a bonus of fifty dollars for opening a new checking account. Each business rule may facilitate the performance of a service by the process object 330.

In one example embodiment, the service adaptation layer 370 may provide a mapping functionality between the process object 330 and the one or more backend systems 235.

Process Object

In one example embodiment, the process object 330 may act as a mediator between the applications 210 and the backend systems 235. The process object 330 may offer standard enterprise services which may be consumed, for example, from the application layer 205. In one example embodiment, the process object 350 may aggregate atomic services that may be provided by one or more of the backend systems 235 into a single enterprise, or compound, service. The process object 330 may also manage the state of the enterprise service and the overall process state, and may manage work in progress. In one example embodiment, the process object 330 may support business activity logging by documenting various process steps and/or data used in executing the service.

In one example embodiment, the process object 330 may essentially act as a production order for a service that may require a certain input and may produce a certain output. For example, a typical loan boarding process may require a business partner and loan data as input, and may produce a new loan as output. In one example embodiment, the input may be initialized, checked and verified by the process object 330. If the input is successfully verified, the execution of the service may start and may follow a detailed prescription of activities to be performed, including a speckle order of execution of the prescribed activities, that may be orchestrated by the process object 330. If an error is encountered during execution of the prescribed activities, the process object 330 may provide information and/or services to enable the delegation of error correction to, for example, a user.

One or more process objects 330 may be of a particular type where the process object type may determine the one or more services that the process object 330 is capable of supporting. In one example embodiment, in response to a request from an application 210 to perform a new service, the type of process object 330 for performing the new service may be identified and an instance of the process object 330 may be instantiated. Examples of services to be performed include applying for a loan, opening a bank account, transferring funds between accounts and the like. In one example embodiment, in response to the receipt of a request to open a bank account, an instance of a process object may be identified, instantiated, and configured to orchestrate the opening of the account. For example, to process a request for a new checking account, an OPEN-ACCT process object may be instantiated.

The OPENACCT process object may be capable of cooperating with one or more of the backend systems 235 to establish a new bank account. In one example embodiment, the OPENACCT process object may manage, or may orchestrate, a sequence of activities involving the OPEN-ACCT process object and a plurality of the backend systems 235. Managing such activities includes, but is not limited to, calling a service, canceling a service, acquiring backend system data, and the like.

Process Object Persistency

The process object 330 may be associated with a corresponding process object persistency 332 which may maintain information on the corresponding process object 330 and, optionally, related objects. Examples of maintained information include, but are not limited to, state information for the corresponding process object 330. The process object persistency 332 may ensure that work in progress persists by maintaining the corresponding process object 330. For example, if so error is encountered during the execution of a service, the process object persistency 332 may maintain the corresponding process object 330 while an error handling procedure is performed. In one example embodiment, the process object persistency 332 may fog error messages a and/or a process step journal. In one example embodiment, the process object persistency 332 may list updates to be compensated for in a situation where a service has been prematurely aborted and one or more of the one or more backend systems 235 may have been modified by the partial execution of the service (described by way of example more fully below).

Process Object Nodes

In one example embodiment, the process object 330 may comprise one or more process object nodes (not shown). In one example embodiment, a process object, node may be transformed from a business process object residing on one or more of the backend systems 235. In one example embodiment, a process object node may comprise a representation of one or more data elements maintained by a business process object residing on one or more of the backend systems 235. In one example embodiment, a process object node may comprise a representation of all of the one or more data elements that may be maintained in an object residing in one or mere of the one or more backend systems 235. In one example embodiment, a process object node may comprise a representation of a subset of the one or more data elements that may be maintained in an object residing in one of the one or more backend systems 235. The representation of one or more of the one or more data elements may provide a local view, in the process object 330, of the business process object and the corresponding business service on one or more of the one or more backend systems 235. The local view may facilitie the efficient execution and/or orchestration of the tasks of the service by the process object 330. It should be noted that, in one example embodiment, the business process object may be associated with a plurality of different process object nodes.

Process Object Interfaces

Figure 4:
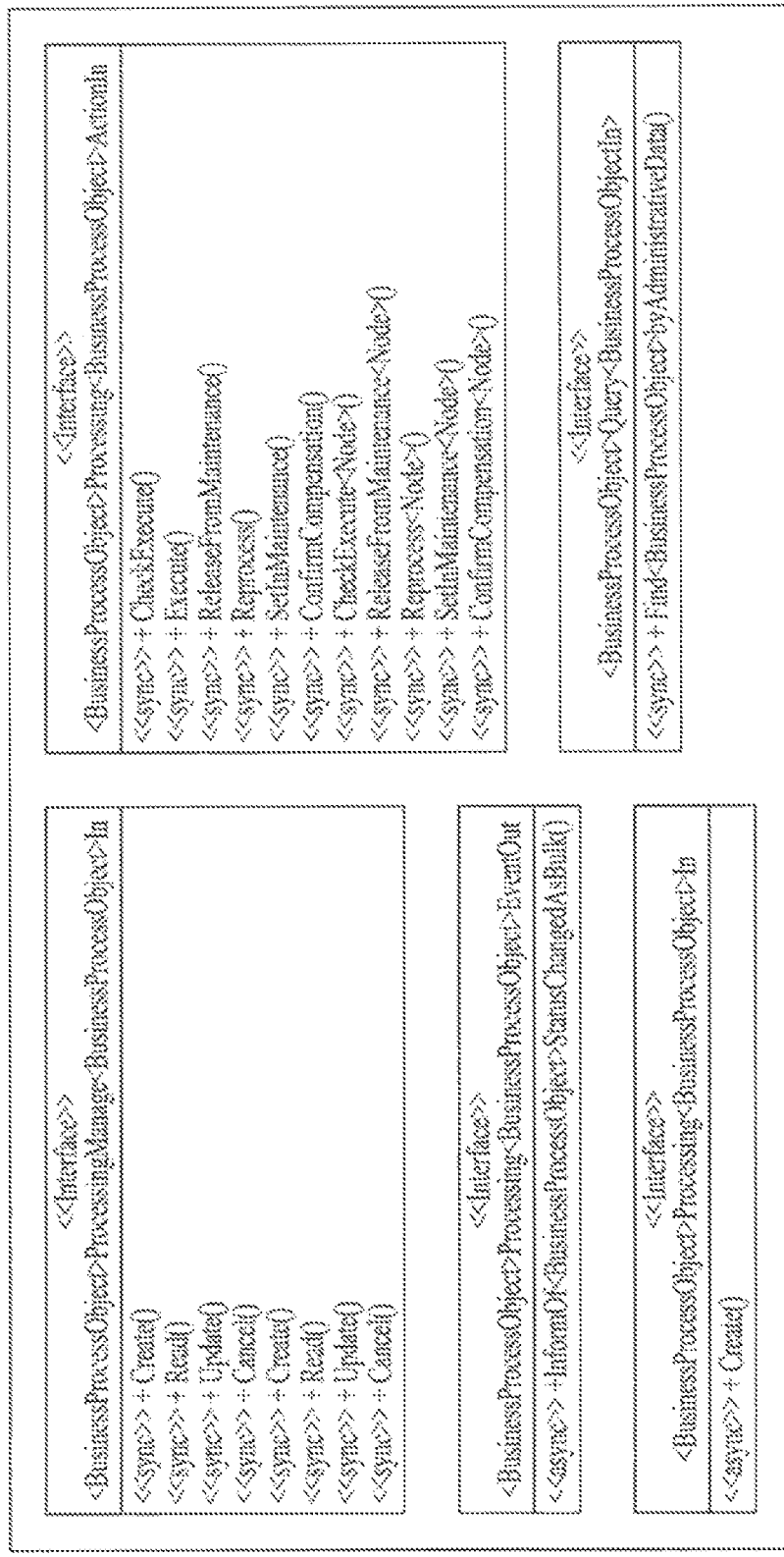
FIG. 4 is a representation of example interfaces, for an example set of services defined for a process object in accordance with an example embodiment.

FIG. 4 is a representation of example interfaces for an example set of services that may be defined for a process object in accordance with an example embodiment. Examples of interfaces include, but are not limited to, create process object, read process object, update process object, cancel process object, create process object node, read process object node, update process object node, and cancel process object node.

Business Process Object Data Model

Figure 5:
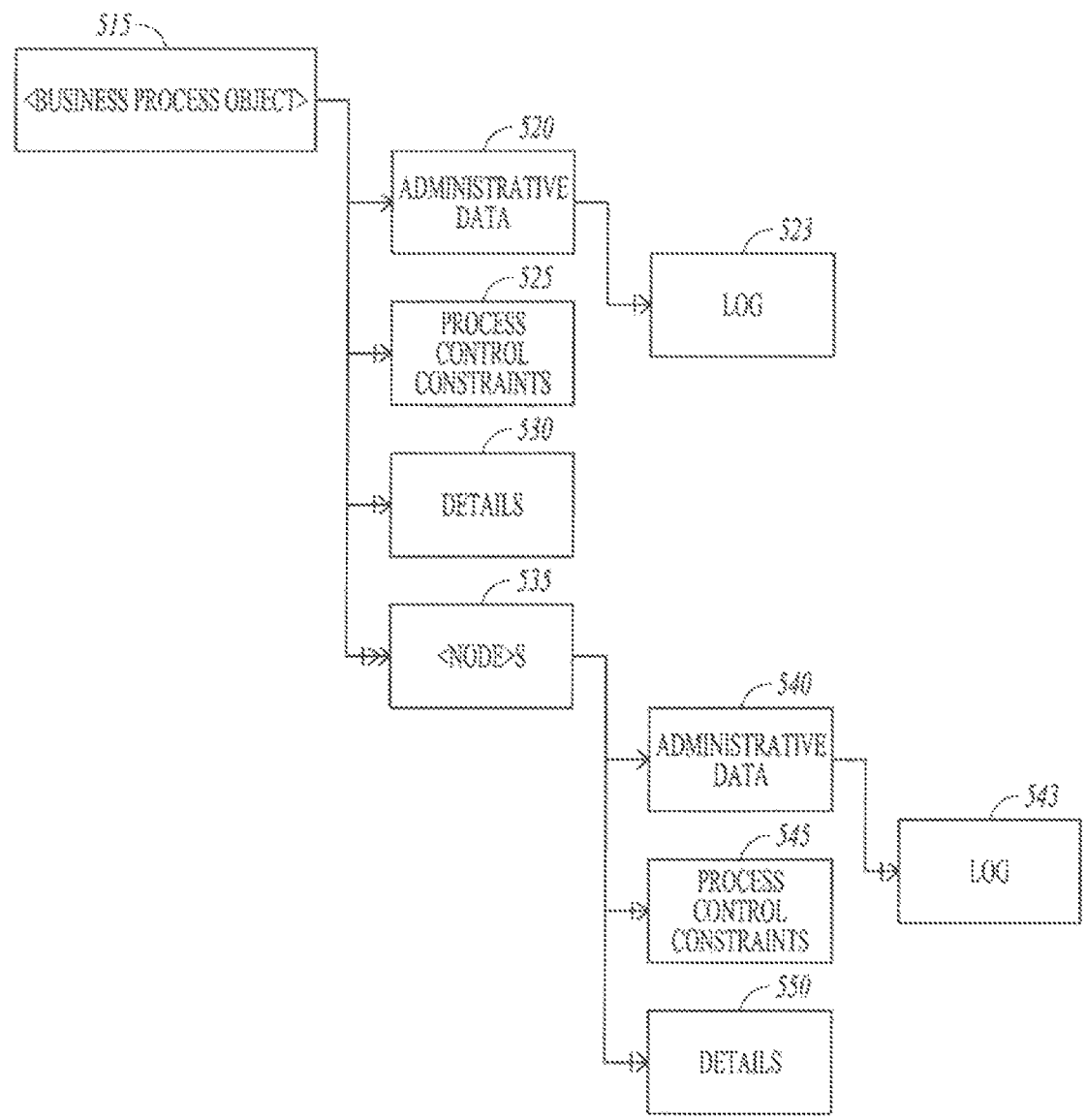
FIG. 5 is a data model of an example business process object node in accordance with an example embodiment.

FIG. 5 is a model of an example business process object in accordance with one example embodiment. A business process object 515 resides on the backend system 235. The business process object 515 comprises administrative data 520 and associated log data 523, process control constraints data 525, and details data 530. An example of the process control constraints data 525 may be data needed to execute a process. For example, a process control constraint may indicate that a particular business rule can be overridden.

In one example embodiment, the process object node 535 may be a representation in the process object 330 of the relevant data that may be maintained by the business process object 515. The process object node 535 may comprise an administrative data representation 540 of the administrative data 520, a log representation 543 of the log data 523, a process control constraints representation 545 of the process control constraints data 525, and a details representation 550 of the derails data 530.

Figure 6:
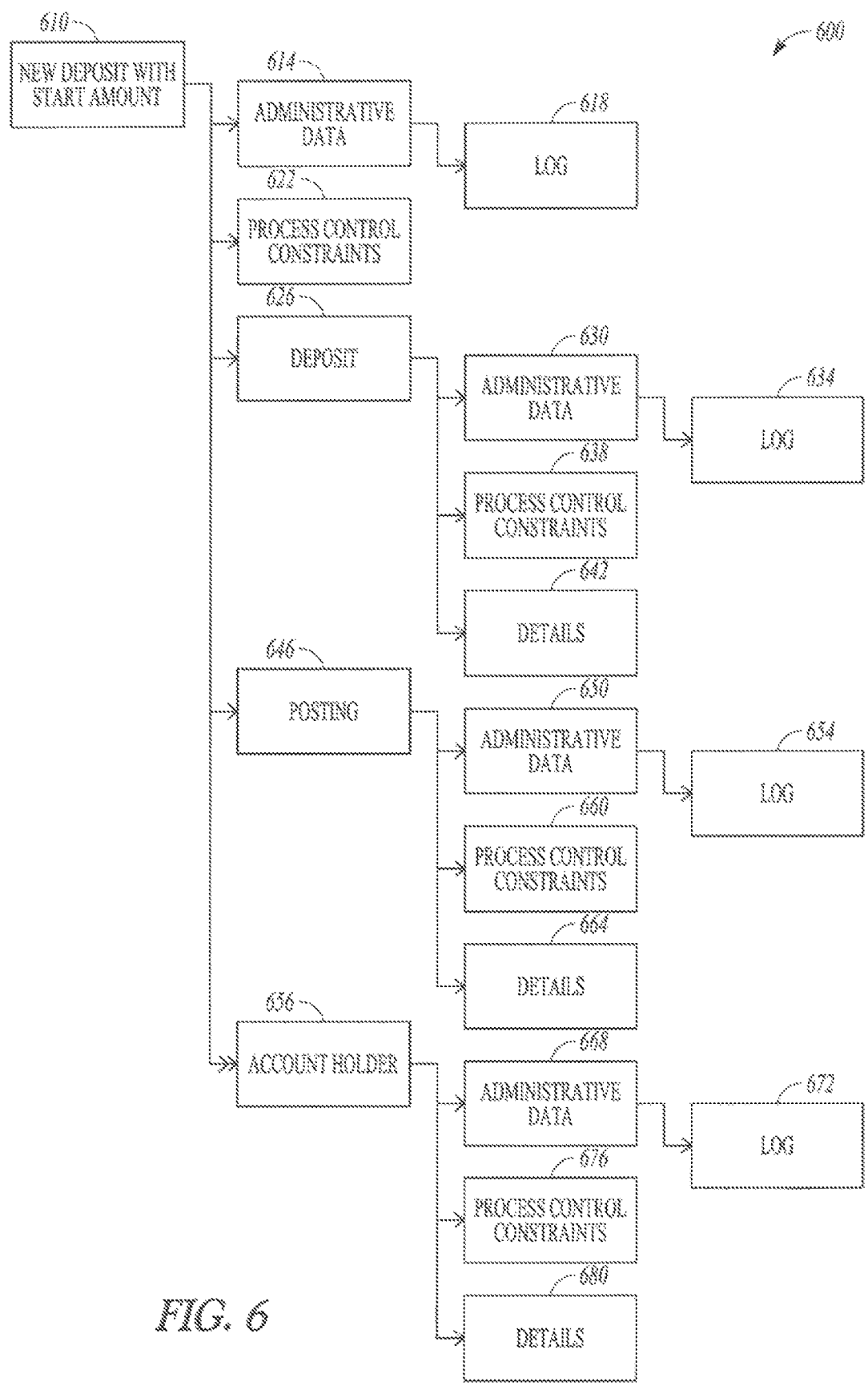
FIG. 6 is a diagram of an element structure for a business process object in accordance with an example embodiment.

FIG. 6 is a diagram of an example element structure for the business process object in accordance with one example embodiment. NewDepositWith StartAmount 610 represents example data associated with an instantiation of an example business process object for processing a new deposit with an initial starting amount (for example, the opening of a new checking account). NewDepositWith StartAmount 610 is associated with Administrative data 614 and Process Control Constraints data 622. Administrative data 614 is associated with Log data 618.

NewDepositWith StartAmount 610 is also associated with Deposit data 626, Posting data 646, and AccountHolder data 656. In one example embodiment, AccountHolder data 656 maintains data for a plurality of account holders. Deposit data 626 is associated with Administrative data 630, Process Control Constraints data 638, and Details data 642. Administrative data 630 is associated with Log data 634. Posting data 646 is associated with Administrative data 650, Process Control Constraints data 660, and Details data 664. Administrative data 650 is associated with Log data 654. AccountHolder data 656 is associated with Administrative data 668, Process Control Constraints data 676, and Details data 680. Administrative data 668 is associated with Log data 672.

Business Rules

In one example embodiment, the process object 330 may access one or more of the business roles in one or more sets of the business rules 340 that may provide information related to one or more services. As described above by way of example, one example business rule may indicate that a client may be entitled to a bonus of fifty dollars for opening a new checking account. In response to accessing the example business rule, an OPENACCT process object may cooperate with one or more of the one or more backend systems 235 to establish a new checking account with a fifty dollar opening balance.

Process Object Features

In one example embodiment, the process object 330 may provide one or more services for consumption by, for example, one or more of the one or more applications 210 and may encapsulate the knowledge and/or information that may be needed to perform the service in cooperation with one or more of the one or more backend systems 235. The process object 330 may also transform data into a form compatible with one or more of the one or more backend systems 235.

In one example embodiment, the process object 330 may provide process composition by combining, for example, individual activities that may be provided as services by the services platform 230 into a compound service. For example, a plurality of atomic activities that may be offered by one or more of the one or more backend systems 235 may be combined into a compound service.

In one example embodiment, the process object 330 may support extensions of the process logic and/or process content of the process object 330 that may support additional variants of a business process. An example extension of the process logic and/or the process content of the process object 330 may enable, for example, different channel applications 210 to support the same business process. In another example embodiment, the process object 330 may support a cross-channel process where a process may be initiated in cooperation with one of the applications 210 and may continue execution in cooperation with a different one of the channel applications 210.

Process Object Processing and Process Object Status Model

Figure 7:
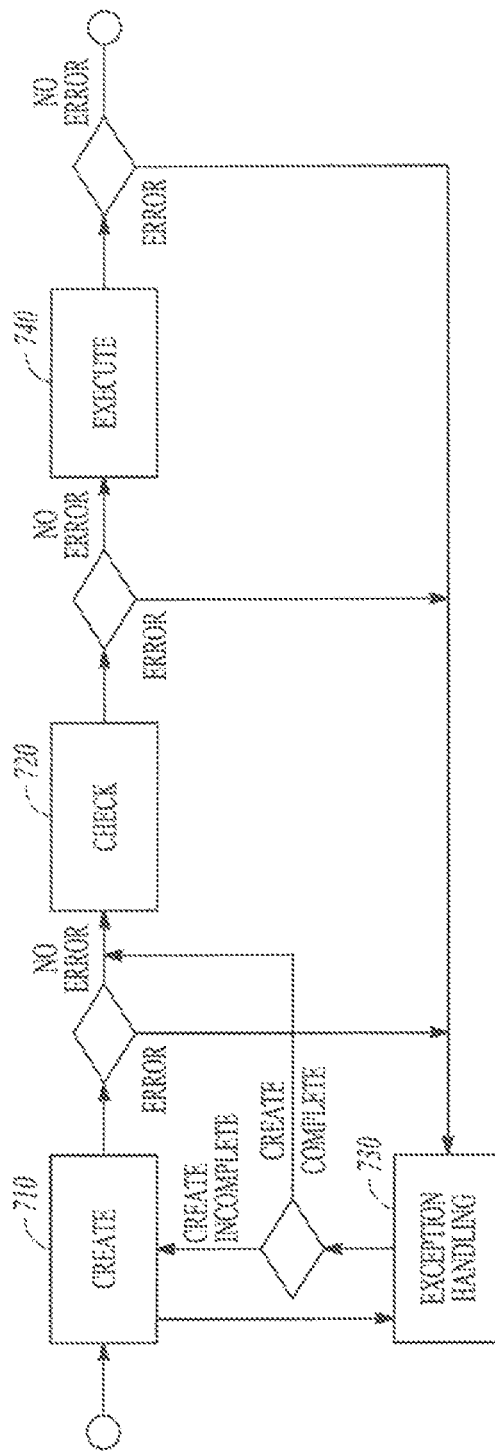
FIG. 7 is a flowchart illustrating four distinct example processing phases of a process object in accordance with an example embodiment.

In one example embodiment, the process object 330 and optional process object node(s) may be processed in a pre-defined sequence comprising a plurality of phases. FIG. 7 is a flowchart illustrating four distinct example processing phases of the process object 330 in accordance with one example embodiment.

Create phase 710 may create an instance of the process object 330 including optional process object node(s). In the create phase 710, the process object 330 may obtain relevant information from one or more of the one or more backend systems 235 that may be needed for performing a process and/or creating the process object nodes.

Check phase 720 may perform validations and checks on the process object 330 and the optional process object nodes. In one example embodiment, one or more of the one or more business rules may be checked during the check phase 720. In one example embodiment if one or more corresponding business process objects residing on one or more of the one or more backend systems 235 offer check services, the process object 330 may initiate a check of the business process object during the check phase 720.

In an exception handling phase 730, the process objects 330 may be updated and/or errors may be handled. In one example embodiment, a process object node may be created, updated and/or deleted during the exception handling phase 730. Upon completion of the exception handling phase 730, a transition to the create phase 710 may be performed if the create phase 710 is not complete, and a transition to the check phase 720 may be performed if the create phase 710 is complete.

In an execute phase 740, the finalization of the processing of the process object 330 and the optional process object nodes may be triggered. In one example embodiment, the execute phase 740 may trigger the creation and/or update of business process objects on one or more of the one or more backend systems 235.

If an error is encountered in any of the create phase 710, check phase 720, and execute phase 740, a transition to exception handling phase 730 may be performed.

Process Object State Diagram

Figure 8:
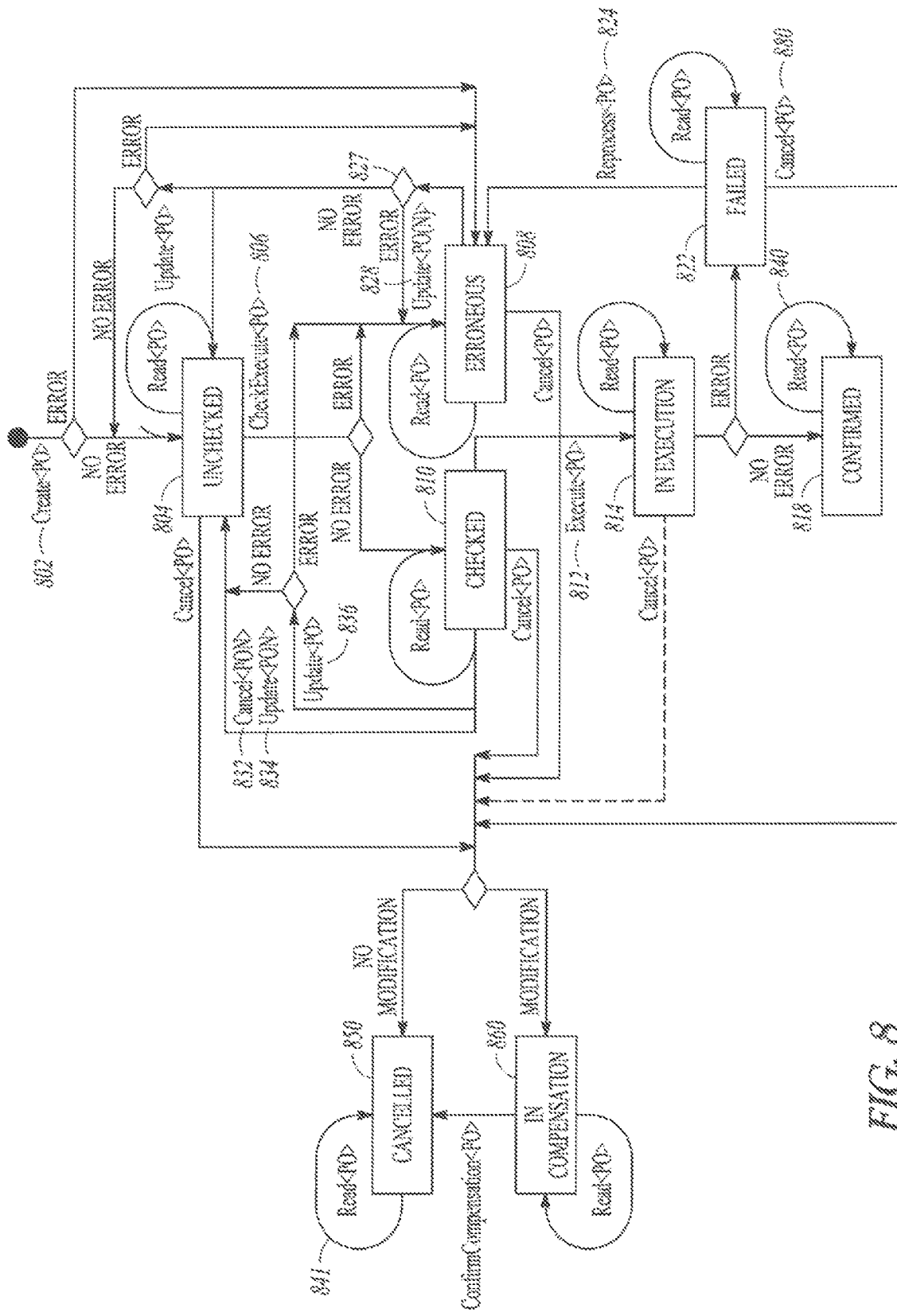
FIG. 8 is a state diagram of a process object status model in accordance with an example embodiment.

Each of the above-described example phases may correspond to one or more example states of the process object 330. FIG. 8 is an example state diagram of a process object status model in accordance with an example embodiment. In one example embodiment, the process object 330 may reside in one of ten example states:

State=Unchecked: indicates that the node of the business project object has not been checked according to the defined business rules;

State=Checked: indicates that the node of the business project object has been checked successfully according to the defined business rules;

State=Erroneous: indicates that the node of the business project object is erroneous according to the defined business rules;

State=InMaintenance: indicates that the node of the business project object is in maintenance for post processing:

State=Waiting: indicates that the node of the business project is waiting or execution;

State=InExecution: indicates that the node of the business project object is currently being executed;

State=Failed: indicates that the execution of the node of the business project object has failed;

State=Confirmed: indicates that the node of the business project object has been successfully executed and it's execution has been confirmed;

State=Canceled; indicates that the node of the business project object is canceled; and State=InCompensation; indicates that the execution of the node of the business project object has failed and, in order to cancel this node, a condensation is needed.

Turning to FIG. 8, the application 210, for example, may initiate the performance of a service by, for example, issuing a create process object service call (CREATE <PO> 802). In response to the create process object service call (CREATE <PO> 802), the process object 330 of a type corresponding to the service to be performed may be created. If a failure is encountered during the creation phase, the process object 330 transitions to state ERRONEOUS 808 (described by way of example more fully below). For example, if the business process object on one or more of the one or more backend system 235 fails to respond to a service call, the process object 330 may transition to state ERRONEOUS 808. If the process object 330 is successfully created, tire process object 330 may transition to state UNCHECKED 804, indicating that at least one node of a business project object has not been checked according to the defined business rules.

In state UNCHECKED 804, in response to a call for executing a check service (CHECKEXECUTE <PO> 806), the process object 330 may perform a check of the one or more nodes of the one or more business process objects that may be required to perform the service in accordance with the corresponding one or more business rules.

If one or more of the one or more business rules are violated, the process object 330 transitions to state ERRONEOUS 808, indicating that at least one node of at least one business process object is erroneous according to the defined business rules. The state ERRONEOUS 808 is described by way of example more fully below. If the business rules are not violated, the process object 330 transitions to state CHECKED 810, indicating that the nodes of the one or more business project objects have been checked successfully according to the defined business rules.

In state CHECKED 810, if changes related to the requested service have been received by, for example, the application 210, the application 210 may issue a service call to update process object 330 (UPDATE <PO> 836), update a process object node (UPDATE <PON> 854), or cancel a process object node (CANCEL <PON> 832) (described by way of example more fully below). If no changes to the requested service have been received in state CHECKED 810 and an execute service call (EXECUTE <PO> 812) has been issued by, for example, the application 210, the process object 330 transitions to state INEXECUTION 814 and may perform the specified service.

In state INEXECUTION 814, the process object 330 may orchestrate the execution of the service by consuming services that may be offered by the business process objects residing on one or more of the one or more backend systems 235. In one example embodiment, the process object 330 may orchestrate the execution of the service by consuming services that may be offered by the business process objects by calling the consumed services in a prescribed order. In one example embodiment, the process object 330 may perform an execution wait operation while waiting for a called service on the backend system 235 to complete execution.

If all services offered by called business process objects residing on one or more of the one or more backend systems 235 complete successfully, as indicated by the corresponding process object nodes residing in the process object 330, the process object 330 transitions to state CONFIRMED 818. If at least one of the services offered by called the business process objects residing on one or more of the one or more backend systems 235 fall to complete successfully, as indicated by the correspond process object nodes residing in the process object 330, the process object 330 transitions to state FAILED 822 (described by way of example more fully below).

In the state CONFIRMED 818, the requested service has been successfully completed. In state CONFIRMED 818, the process object 330 may be maintained in a read-only condition where information on the state and/or status of the process object 330 may be obtained via a read service call (READ <PO> 840).

In the state FAILED 822, a failure have been encountered, and the process object 330 may be canceled or reprocessed. If a cancel service call CANCEL <PO> 880 is issued by, for example, the application 210, a cancellation procedure, described by way of example more fully below, may be performed. If a reprocess service call (REPROCESS <PO> 824) is issued, the process object 330 transitions to state ERRONEOUS 808.

In the state ERRONEOUS 808, one or more of the one or more process object nodes may need to be updated to handle the encountered error. An update process object node service call (UPDATE <PON> 828) may therefore be issued by, for example, the application 210 to update at least one of the one or more process object nodes that may be in an erroneous condition (due to the state of its corresponding business process object). Upon completion of the update process object node service (UPDATE <PON> 828), a test 827 may be performed to determine if one or more process object nodes remain in an erroneous condition. If one or more process object nodes remain in an erroneous condition, the process object 330 transitions back to the state ERRONE-OUS 808 and may process the updating of the remaining erroneous process object nodes. If no process object nodes are in an erroneous condition, the process object 330 transitions to the state UNCHECKED 804. In the state UNCHECKED 804, an execution of the service may be retried.

Returning to the description of the state CHECKED 810 illustrated by way of example in FIG. 8, if changes to the requested service have been received by, for example, the application 210, the process object 330 may be called to implement the changes). For example, the process object 330 may cancel a process object node in response to a cancel project object node service call (CANCEL <PON> 832), or the process object 330 may update a process object node in response to an update process object node service call (UPDATE <PON> 834). In either case, the process object 330 may perform the called service and transition to the state UNCHECKED 804. Alternatively, the process object 330 may update process object 330 in response to an update process object service call (UPDATE <PO> 836). If the update process object service call (UPDATE <PO> 836) is completed successfully, the process object 330 transitions to the state UNCHECKED 804. If the update process object service call (UPDATE <PO> 836) is not completed successfully, the process object 330 transitions to the state ERRONEOUS 808. For example, if a process object node is in an error condition following the update to process object 330, the process object 330 transitions to the state ERRONEOUS 808.

In one or more of the states UNCHECKED 804, CHECKED 810, ERRONEOUS 808, FAILED 822, and, optionally, INEXECUTION 814, a cancel process object service (CANCEL <PO>) may be called to cancel the process object 330 and corresponding service. If no backend system 235 has been modified by the partial performance of the service prior to the calling of the cancel process object service (CANCEL <PO>), the process object 330 transitions to state CANCELLED 850. In the state CANCELLED 850, the process object 330 may be maintained in a read-only condition where information on the state and/or status of the process object 330 may be obtained via a read service call (READ <PO> 841). If at least one backend system 235 has been modified by the partial performance of the service prior to calling the cancel process object service (CANCEL <PO>), the process object 330 transitions to state INCOMPENSATION 860.

In the state INCOMPENSATION 860, compensation may be performed to address the modification(s) to the backend system(s) 235 that occurred during the partial performance of the aborted service. In one example embodiment, if a checking account has been created and a bank client decides to abort the new account request, the appropriate backend system 235 may be called to, for example, lock the newly created account.

It should be noted that, in the example embodiment of FIG. 8, the process object 330 may offer a read service (READ <PO>) in one or more states in order to provide, for example, the state of the process object 330.

In one example embodiment, an overall status may be calculated for a process of the process object 330. In one example embodiment, if any process object node of process object 330 is in state ERRONEOUS 808, the state of the overall process is ERRONEOUS.

In one example embodiment, if no process object node of process object 330 is in state ERRONEOUS 808 and one or more process object nodes of process object 330 are in state UNCHECKED 804, the state of the overall process is UNCHECKED.

In one example embodiment, if no process object node of process object 330 is in state ERRONEOUS 808, no process object node of process object 330 is in state UNCHECKED 804, and one or more process object nodes of process object 330 are in state INCOMPENSATION 860, the state of the overall process is INCOMPENSATION.

In one example embodiment, if no process object node of process object 330 is in state ERRONEOUS 808, no process object node of process object 330 is in state UNCHECKED 804, and no process object node of process object 330 is in state INCOMPENSATION 860, and one or more process object nodes of process object 330 are in state CHECKED 810, the state of the overall process is CHECKED.

In one example embodiment, if any process object node of process object 330 is in state INEXECUTION 814, the state of the overall process is IN EXECUTION.

In one example embodiment, if no process object node of process object 330 is in state INEXECUTION 814 and one or more process object nodes of process object 330 are in state FAILED 822, the state of the overall process is FAILED.

In one example embodiment if no process object node of process object 330 is in state ERRONEOUS 808, no process object node of process object 330 is in state UNCHECKED 804, no process object node of process object 330 is in state INCOMPENSATION 860, no process object node of process object 330 is in state CHECKED 810, no process object node of process object 330 is in state INEXECUTION 814, and no process object node of process object 330 is in state FAILED 822, and one or more process object nodes of process object 330 are in state CONFIRMED 818, the state of the overall process is CONFIRMED.

In one example embodiment, if all process object nodes of process object 330 are in state CANCELLED 850, the state of the overall process is CANCELLED.

Figure 9:
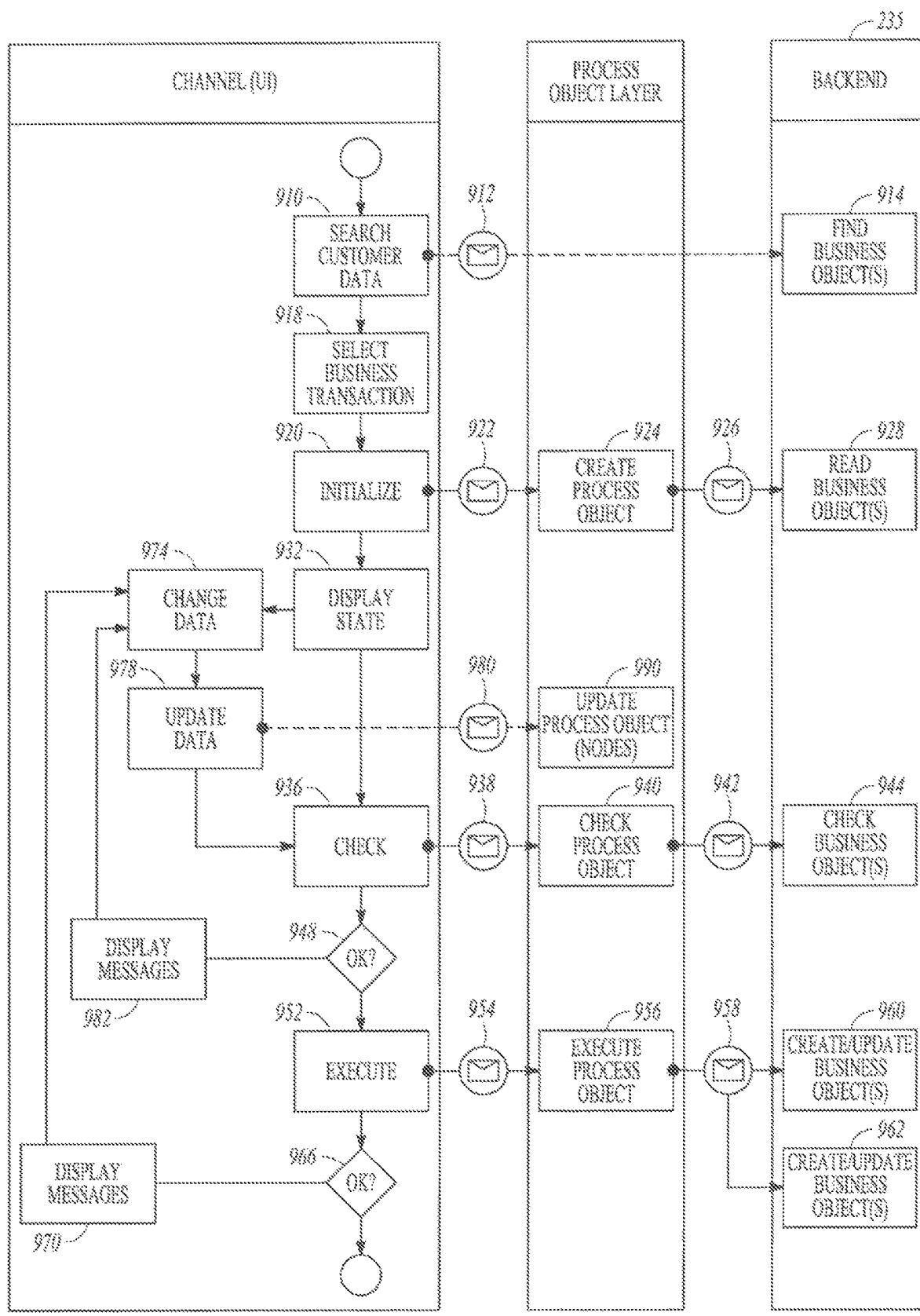
FIG. 9 is a message flow model for performing a user-driven service in accordance with an example embodiment.

FIG. 9 is a message flow model for performing a user-driven service in accordance with an example embodiment. In one example service, a bank client may utilize the application 210 to transfer funds between two existing bank accounts. The bank client may initially enter the required identification and account information via, for example, a user interface of the application 210. In response, the application 210 may issue message 912 to one or more of the one or more backend systems 235 to perform a search for the client's customer data (step 910). A business process object on each messaged backend system 235 may issue a reply to the application 210 that may comprise relevant customer data (step 914). Example customer data includes, but is not limited to, account identification numbers, account balance, and the like.

The bank client may then select a type of business transaction (step 918). Example business transaction types include, but are not limited to, opening an account, applying for a loan, transferring funds between accounts, and the like. In the present example, the bank client selects a funds transfer transaction. In response, the application 210 may perform an initialization function and may identify the type of the process object 330 that may be required to perform a transfer of funds between accounts (step 920). During step 920, the application 210 may issue message 922 calling a create process object service (CREATE<PO>) that may instantiate an instance of the process object 330 of type TRANSFER (step 924).

The process object 330 may subsequently issue message 926 to a business process object residing on backend system 235 to read the relevant business process objects (step 928) and may instantiate one or more process object nodes within the process object 330 to provide a local representation of each relevant business process object.

Upon completion of the initialization step 920, the application 210 may display the service state to the bank client and/or administrative personnel (step 932). If a service related change is requested during display step 932, the application 210 transitions to change data step 974 (described by way of example more fully below). If no service related change is requested during display step 932, the application 210 transitions to check step 936.

In the check step 936, the application 210 may issue message 938 to the process object 330 to call a check service (CHECKEXECUTE<PO>). The process object 330 may execute the check service (step 940) and may issue message 942 to the backend system 235 to call a check service that may be provided by a business process object on the backend system 235. In response, the business process object may perform the associated check (step 944). For example, an account balance may be verified.

Upon completion of the check step 936, the application 210 may determine if all checks were successful (step 948). If all checks were successful, the application 210 transitions to execute step 952 (described by way of example more fully below). If a check was not successful, the application 210 transitions to display message step 982.

In the display message step 982, the application 210 may display a message to a user that may comprise an indication of the check failure. Examples of a user are a bank client, an administrator, bank personnel, and the like. The application 210 transitions to change data step 974 and may allow a user to make changes to service related, data. In response to obtaining any changes to the service related data, the application 210 transitions to update data step 978 and may issue message 980 to the process object 330 to call an update process object node service (UPDATE<PON>). In response to the update process object node service call (UPDATE<PON>), the process object 330 may perform the update to the appropriate process object nodes (stop 990). The application 210 then transitions to Check step 936.

Returning to the execute step 952, the application 210 may issue message 954 to the process object 330 to call an execute service (EXECUTE<PO>). In the present example, the service is a transfer of funds between accounts. In response, the process object 330 may issue one or more service calls via one or more messages 958 to one or more business process objects on one or more of the one or more backend systems 235 to orchestrate the transfer of funds between accounts (step 956). In the example message flow model of FIG. 9, two backend systems 235 are used to perform the transfer of funds. The backend systems 235 may implement the transfer of funds during steps 960 and 962.

The application 210 may perform a test to determine if the service executed successfully (step 966). If the service executed successfully, the service may be complete. If the service did not execute successfully, the application 210 transitions to display messages step 970 and may display a status message that may comprise an indication of, for example, the execution status to, for example, a user. The application 210 then transitions to change data step 974 and may allow a user to make changes, for example, to service related data. The application 210 then transitions to update data step 928 and may update, for example, the relevant process object nodes and may retry the execution of the service.

Figure 10:
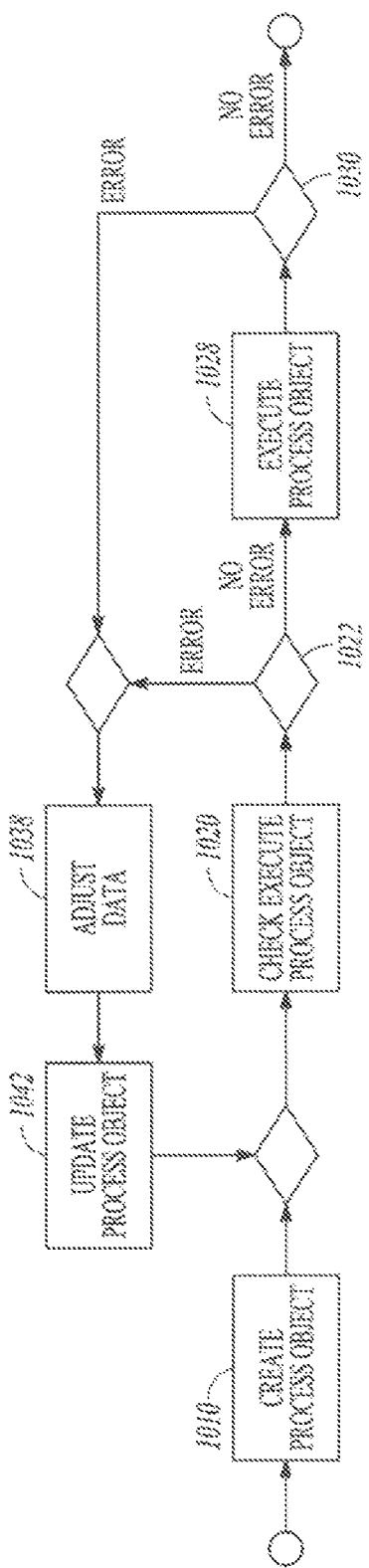
FIG. 10 is a message flow model for performing a BPM-driven service in accordance with an example embodiment.

FIG. 10 is a message flow model for performing a BPM-driven service in accordance with an example embodiment. In the example embodiment of FIG. 10, a service to transfer funds between bank accounts may be performed.

A background process, such as a background process residing on the BPM system 240, may issue a create process object service call (CREATE<PO>) to, for example, instantiate an instance of the process object 330 of type TRANSFER (step 1010). The process object 330 may be created and may subsequently issue a message to the backend system 235 to, for example, read the relevant business process objects and may instantiate one or more process object nodes within the process object 330 to provide, for example, a local representation of each of the one or more relevant business process objects.

The BPM system 240 may subsequently issue a message to the process object 330 to call, for example, a check service (CHECKEXECUTE<PO>) (step 1020). In response to the check service call the process object 330 may issue a check service call to one or more business process objects on one or more of the one or more backend systems 235. In response, each business process object may execute a check service. For example, an account balance may be verified. Upon completion of the check step 1020, the BPM system 240 may determine if all checks were performed successfully (step 1022). If any check was not successful, the BPM system 240 may allow a user to, for example, modify service related data (step 1038) (described by way of example more fully below). If all checks were successful, the BPM system 240 may issue a message to the process object 330 to call for example, an execute service (EXECUTE <PO>). In the present example, the service is a transfer of funds between bank accounts. In response, the process object 330 may issue one or more service calls to one or more of the one or more backend systems 235 and may orchestrate a transfer of funds by consuming services from one or more business process objects residing on one or more of the backend systems 235 (step 1028).

The BPM system 240 may then performs a test to determine if the service executed successfully (step 1030). If the service executed successfully, the service may be complete. If the service did not execute successfully, the BPM system 240 transitions to adjust data (step 1038) and may allow a user to, for example, modify service related data.

In the adjust data step 1038, a user may modify data related to the service to address the failure of the check service or execute service. The BPM system 240 may also issue an update process object node service call (UPDATE<PON>) to the process object 330. In response to the update process object node service call (UPDATE<PON>), the process object 330 may perform the update to the appropriate one or more process object nodes (step 1042). The BPM system 240 may subsequently reissue a check service call (CHECKEXECUTE<PO>) to the process object 330 and the execution of the service may be retried.

Supplemental Orchestration Layer

In one example embodiment the process object layer 220 may be configured to mediate with only a subset of the available backend systems 235. In this embodiment, a supplemental orchestration layer may be utilized to orchestrate services with one or more of the remaining backend systems 235. The supplemental orchestration layer may reside between application layer 205 and services platform 230. In another example embodiment a supplemental orchestration layer may issue a service call to the backend system 235 and may issue a service call to the process object layer 220. In this embodiment, the process object layer 220 may provide an orchestration service for the supplemental orchestration layer across a subset of the available backend systems 235.

Design Time

The POL framework may include a Design Time environment for the development of processes based on process objects and process object nodes, and the associated services. The framework may include one or more of the following generic components: status model phase model and phase model arrangement, service interlaces and operations, persistency, rules and business rule connection, user interface templates, and the like. In one example embodiment, the run time environment may be independent of the design time environment.

During design time, the process object 330 may be modeled as data types for a specific process. During design time, one or more of the following may be generated; one or more message types, one or more service interfaces, one or more message data types, and one or more service operations of the process object layer. The metadata captured during design time may fee used to generate one or more of: corresponding code, one or more services, one or more structures, and persistency. In one example embodiment, the generation and/or metadata entry may follow a predefined sequence to allow, for example, the usage of intermediate results for further generation and/or metadata entry steps. In one example embodiment, manual programming may be performed to complete the implementation of the process object layer 320. In this case, manual programming may only be required when the required information is not contained in available machine-readable models and/or the framework.

In one example embodiment, the Design Time environment may contain a generic process object (GPO) with optional business process object nodes. The generic process object and optional generic process object nodes may contain generic information common to a plurality of processes and/or process specific attributes, and may comprise generic service interfaces and/or generic operations. The GPO may provide for the incorporation of one or more new process objects types.

The Design Time environment also optionally enables POL processes to be adapted and/or extended. In one example embodiment, the Design Time environment may provide for one or more of the following: adding process object nodes, modifying process object nodes, adding additional service calls to existing process nodes, and adding attributes to process object nodes. In one example environment, the Design Time environment may provide for the modification of the process object 330 in order to adapt to changes in the backend system 235 and/or adapt to changes in backend system business objects.

In one example embodiment, the following components may be modeled, generated, and/or implemented for a process during design and/or run time: process object metadata (including, but not limited to, a process name, a namespace, a package name, a software component and the like). In one example embodiment, the process object nodes may include one or more of the following: process specific control data, a business object view structure, a list of backend services which may be consumed, a mapping of process object nodes to backend services, a sequence of process object nodes in each phase with a corresponding sequence of related backend services, one or more business rules, one or more user interface components, and a BPM system for automatic processing.

Figure 11:
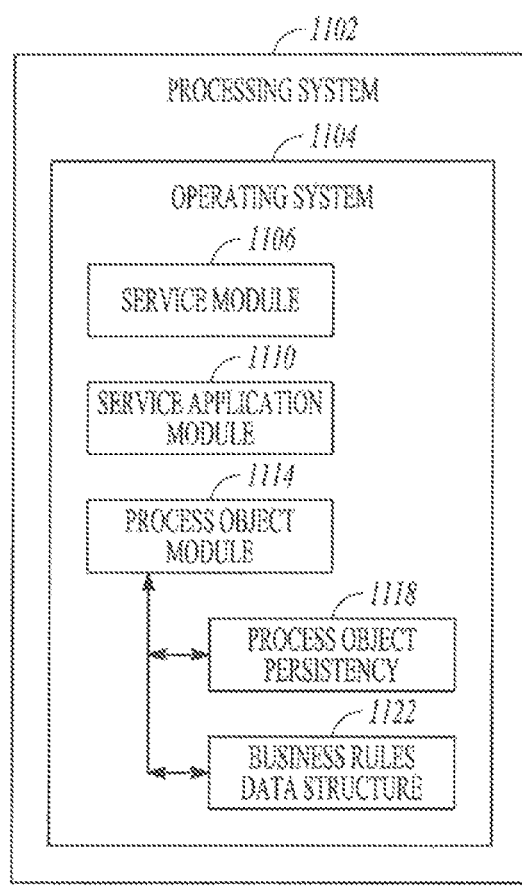
FIG. 11 is a block diagram of an apparatus, in accordance with an example embodiment, to mediate a service with a services platform.

FIG. 11 is a block diagram of an apparatus, in accordance with an example embodiment, to mediate a service with a services platform. For example, the apparatus 1100 may be used to mediate between one or more applications 210 and one or more backend systems 235 and, accordingly, is described by way of example with reference thereto.

The apparatus 1100 is shown to include a processing system 1102 that may be implemented on a server, client, or other processing device that includes an operating system 1104 for executing software instructions. In accordance with an example embodiment, the apparatus 1100 includes a service module 1106, service application module 1110, and process object module 1114. In accordance with an example embodiment, the apparatus 1100 includes a business rules data structure 1122 and a process object persistency 1118.

Figure 12:
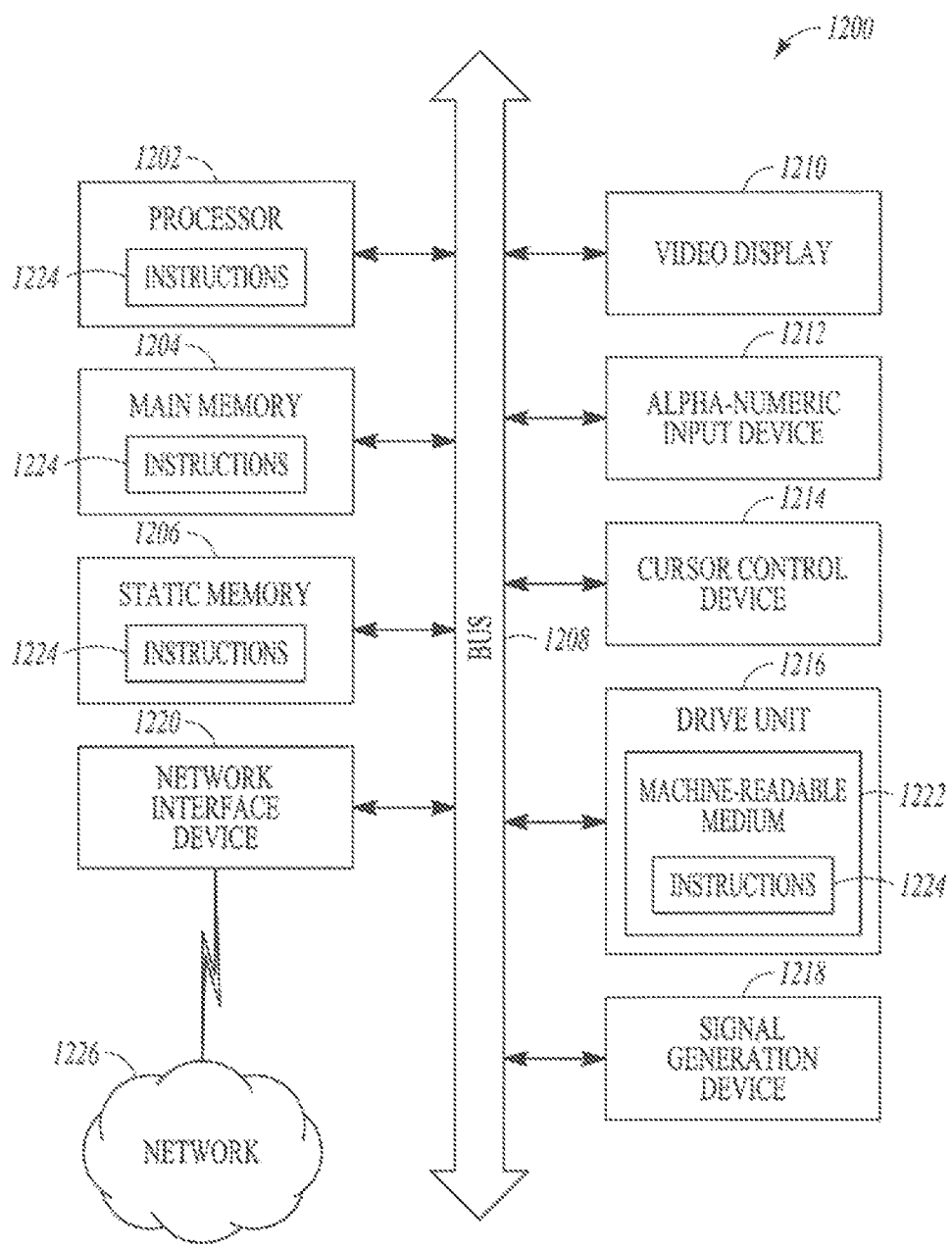
FIG. 12 is a block diagram of a computer processing system within which a set of instructions, for causing the computer to perform any one or more of the methodologies discussed herein, may be executed.

FIG. 12 is a block diagram of a computer processing system 1200 within which a set of instructions, for causing the computer to perform any one or more of the methodologies discussed herein, may be executed. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment. In a networked deployment, the computer may operate in the capacity of a server or a client computer in a server-client network environment, or as a peer computer in a peer-to-peer (or distributed) network environment.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a Personal Digital Assistant (FDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1200 includes processor 1202 (e.g., a central processing unit (CPU), a graphics processing unit (GPU) or both), main memory 1204 and static memory 1206, which communicate with each other via bus 1208. The processing system 1200 may further include video display unit 1210 (e.g., a plasma display, a liquid crystal display (LCD) or a cathode ray tube (CRT)). The processing system 1200 also includes alphanumeric input device 1212 (e.g., a keyboard), a cursor control device 1214 (e.g., a mouse, touch screen, or the like), a disk drive unit 1216, a signal generation device 1218 (e.g., a speaker), and a network interface device 1220.

The disk drive unit 1216 includes machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the processing system 1200, the main memory 1204 and the processor 1202 also constituting computer-readable, tangible media.

The instructions 1224 may further be transmitted or received over network 1226 via a network interface device 1220 utilizing any one of a number of well-known transfer protocols (e.g., HTTP).

While the computer-readable medium 1222 is shown in an example embodiment to be a single medium, the term "computer-readable medium" should be taken to include a single medium or multiple media (e.g., a centralized or distributed database, and/or associated caches and servers) that, store the one or more sets of instructions. The term "computer-readable medium" shall also be taken to include any medium tout is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "computer-readable medium" shall accordingly be taken to include, but not be limited to, solid-state memories, and optical and magnetic media.

While the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

For example, a POL framework may include a BPM system and no application layer. In one example embodiment, only the BPM system 240 provides service requests to the process object layer 220 and there are no applications 210. In one example embodiment, only the BPM system 240 provides service requests to the process object layer 220 and one or more applications 210 provide functionality other than service requests to the process object layer 220.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A computerized method for providing a service, the method comprising:
   instantiating, using at least one processor of a machine; an instance of a process object of a service infrastructure, wherein the process object comprises a first data structure and is configured to manage two or more business process objects of the service infrastructure that reside external to the process object and on two or more heterogeneous backend systems, each of the two or more business process objects comprising a corresponding data structure containing information related to the corresponding business process object, the first data structure maintaining a local representation of at least a portion of the information in one of the corresponding data structures, each of the heterogeneous backend systems providing different functionality; and performing, using the one or more processors, the service utilizing the process object of the service infrastructure and at least one of the backend systems.

2. The method of claim 1, further comprising obtaining a service request from one or more of a service application and a background process.

3. The method of claim 1, wherein said process object is configured to check one or more nodes of one or more of said business process objects based on one or more business rules.

4. The method of claim 1, wherein said process object is identified by a process object type and configured to perform one or more services corresponding to said process object type.

5. The method of claim 1, further comprising instantiating one or more process object nodes comprising a representation of two or more objects of said one or more backend systems.

6. The method of claim 1, further comprising aggregating two or more services provided by said two or more backend systems into a compound service.

7. The method of claim 1, wherein said process object comprises one or more process object nodes, wherein each process object node comprises a representation of one or more data elements of one or more of said two or more backend systems.

8. The method of claim 7, wherein said one or more represented data elements represent a subset of data elements maintained by an object of one of said two or more backend systems.

9. The method of claim 1, wherein said process object is further configured to manage an order of a sequence of processes performed by said two or more backend systems.

10. The method of claim 1, wherein said instantiated process object is configured to initially interface with a first application to process said service and is configured to transition to interface with a second application to continue processing said service.

11. The method of claim 1, wherein said instantiated process object resides in a process object layer, wherein said process object layer is located between an application layer and a services platform layer.

12. The method of claim 1, further comprising accessing one or more business rules to facilitate said performance of said service.

13. The method of claim 1, further comprising persistently storing a state of said process object in a storage element.

14. The method of claim 13, wherein said storage element maintains a history of one or more of: one or more states of said process object; one or more activities of said process object; and one or more data elements associated with said process object.

15. The method of claim 13, wherein said storing step is performed in response to one or more of a completion of said service, an identification of an error condition, and a completion of an error handling procedure.

16. The method of claim 1, further comprising:
identifying an error in performing said service;
generating an alert comprising an indication of said error; and
maintaining said process object during a corresponding error handling procedure.

17. The method of claim 1, wherein said process object is based on a generic process object, wherein said generic process object comprises one or more generic service interfaces and one or more generic operations.

18. The method of claim 1, further comprising compensating for one or more modifications to one or more of said backend systems associated with an aborted service.

19. An apparatus to provide a service, the apparatus comprising:
one or more hardware processors;
memory to store instructions that, when executed by the one or more processors perform operations comprising:
instantiating an instance of a process object of a service infrastructure, wherein the process object comprises a first data structure and is configured to manage two or more business process objects of the service infrastructure that reside external to the process object and on two or more heterogeneous backend systems, each of the two or more business process objects comprising a corresponding data structure containing information related to the corresponding business process object, the first data structure maintaining a local representation of at least a portion of the information in one of the corresponding data structures, each of the heterogeneous backend systems providing different functionality; and
performing the service utilizing the process object of the service infrastructure and at least one of the backend systems.

20. A non-transitory computer-readable storage medium embodying instructions that, when executed by a processor perform operations comprising:
instantiating an instance of a process object of a service infrastructure, wherein the process object comprises a first data structure and is configured to manage two or more business process objects of the service infrastructure that reside external to the process object and on two or more heterogeneous backend systems, each of the two or more business process objects comprising a corresponding data structure containing information related to the corresponding business process object, the first data structure maintaining a local representation of at least a portion of the information in one of the corresponding data structures, each of the heterogeneous backend systems providing different functionality; and
performing the service utilizing the process object of the service infrastructure and at least one of the backend systems.

* * * * *